US005743052A

United States Patent [19]

Mayhall et al.

[11] Patent Number: 5,743,052
[45] Date of Patent: Apr. 28, 1998

[54] BUSINESS RECOVERY INSTALLATION AND METHOD FOR ITS ERECTION

[76] Inventors: Michael W. Mayhall, 701 N. Crosscreek Cir., Walnut, Calif. 91789; John Simons, 30408 Jasmine Valley Dr., Canyon Country, Calif. 91351; Cole Emerson, 8477 Hialeahway, Fair Oaks, Calif. 95628

[21] Appl. No.: 268,770

[22] Filed: Jun. 29, 1994

Related U.S. Application Data

[63] Continuation-in-part of Ser. No. 205,854, Mar. 1, 1994, abandoned.

[51] Int. Cl.$^6$ .................................................. E04H 1/00
[52] U.S. Cl. ......................... 52/36.1; 52/220.7; 52/745.15
[58] Field of Search ........................... 52/36.1, 36.2, 52/239, 220.1, 220.7, 745.15, 745.16; 248/49; 108/50; 312/223.6, 223.1, 236, 223.2, 223.3; 174/48

[56] References Cited

U.S. PATENT DOCUMENTS 3,948,473  4/1976  Mason ............................ 248/49
4,540,847  9/1985  Gardner .......................... 174/48
4,631,881  12/1986 Charman ........................ 52/220.7
5,169,099  12/1992 Yang .............................. 248/49
5,277,005  1/1994  Hellwig et al. ................ 174/48 X
5,357,054  10/1994 Beckerich ....................... 174/48
5,362,923  11/1994 Newhouse et al. ............. 174/48

FOREIGN PATENT DOCUMENTS 8124832  2/1984  United Kingdom ............ 174/48

*Primary Examiner*—Kien T. Nguyen
*Attorney, Agent, or Firm*—Christie, Parker & Hale, LLP

[57] ABSTRACT

A business recovery system includes an array of modular work stations, a central communications center, modular cables, and a trellis structure for establishing a data and power link between the work stations and communications center. The trellis structure is used for channelling cables from the communications center overhead to conduits, or pods, located at each group. The pods are fastened to walls of cubicles housing the work stations. A series of modular jacks on the conduit are used to connect localized data and power links to each work station, thus providing a direct data and power link between the work stations and the communications center.

29 Claims, 7 Drawing Sheets

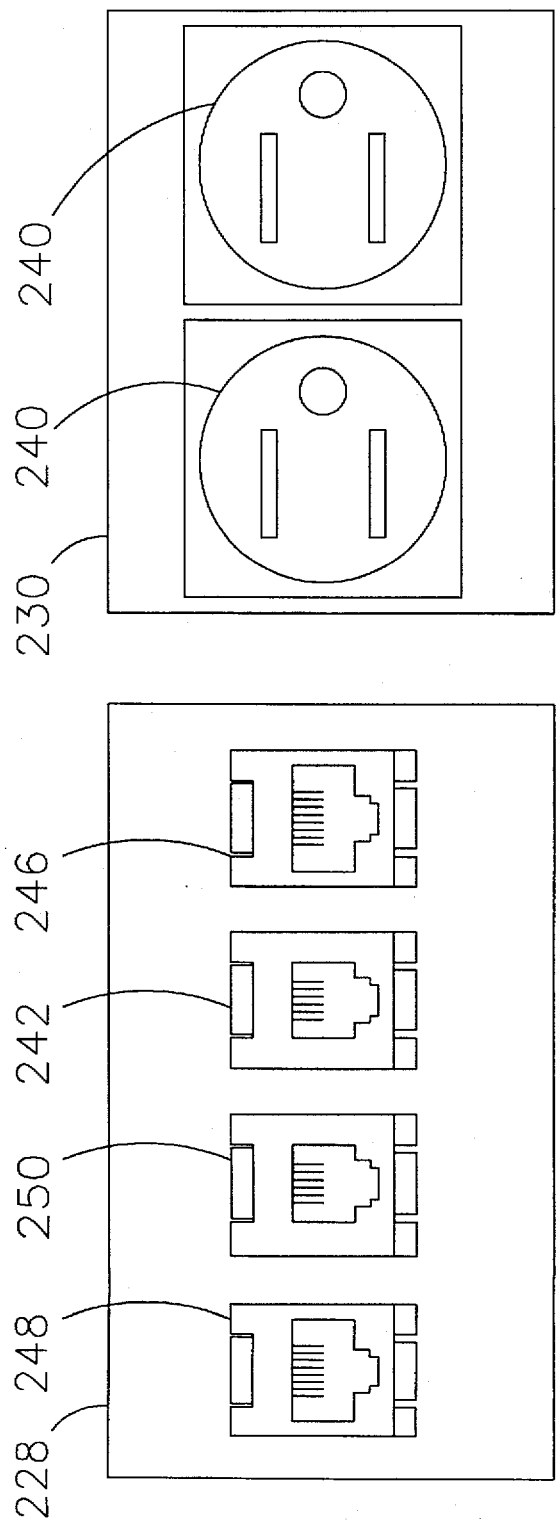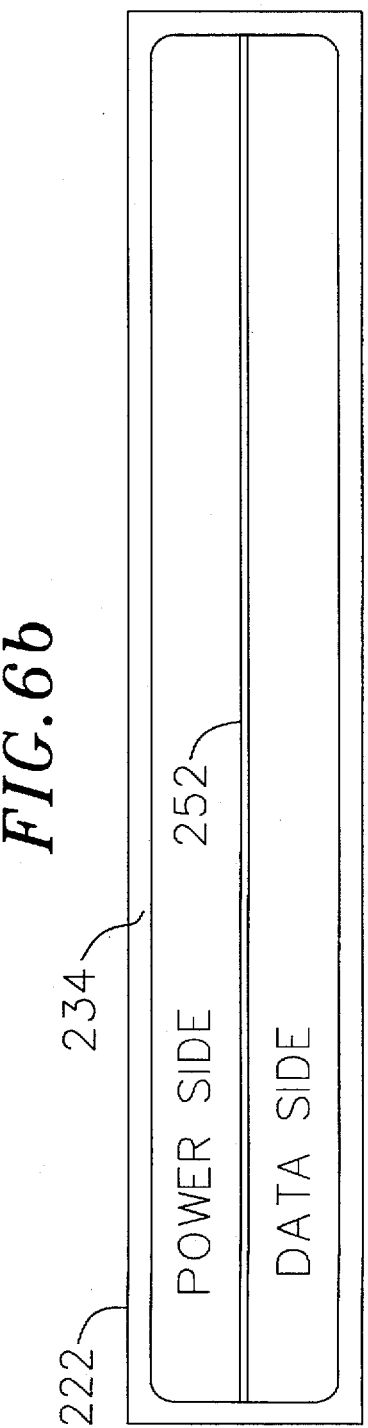

BUSINESS RECOVERY INSTALLATION AND METHOD FOR ITS ERECTION

CROSS-REFERENCE TO RELATED APPLICATIONS

This application is a continuation-in-part of U.S. patent application Ser. No. 08/205,854, filed Mar. 1, 1994, now abandoned.

FIELD OF THE INVENTION

This invention relates to business recovery, and more particularly, to a temporary business recovery installation and method for its erection.

BACKGROUND

Earthquakes, floods, hurricanes, fires, or other disasters often lead to devastation including the closure of business operations, sometimes for extended periods of time. In some cases, the closures are due to the destruction of buildings, blackouts, or other repercussions that render the business facilities unusable. In other cases, transportation to and from the facilities may be unavailable. Because these disasters and the extent of damage caused by them are often unpredictable, it is desirable that a system for business recovery be easily erectable, and flexible enough to be available in off-site locations from which business operations can quickly and temporarily be resumed.

Existing fixed and movable business recovery systems suffer from drawbacks ranging from excessive maintenance cost to limited space. Fixed location business recovery systems are often reliable, but are typically available only on a first come first served basis. To be eligible for potential use, businesses often must reserve such locations in advance and maintain equipment and facilities even when they are not being used. Even then, during a disaster, if a subscribing business is not the first to utilize the system, the business may have to relocate to an inconvenient alternate recovery site, possibly some distance away from the actual business facility. Businesses may also have to resort to an inconvenient alternate site in cases where a disaster or combination of circumstances affects both the business facility and the fixed recovery site.

Mobile recovery systems housed in trailers can be moved to convenient locations, but are usually more expensive than fixed systems and suffer from inflexible space limitations. In some cases involving mobile systems, recovery time during a disaster could become unacceptably long because the recovery site often must be leveled before the trailers can be anchored. The trailers also must be stored during periods of non-use, adding to the overall cost of the system.

In addition to their other drawbacks, both fixed and mobile recovery systems suffer from power and communication distribution constraints that make it difficult to alter the layout of the system to meet the needs of different businesses. These constraints arise because each system is typically prespotted with a set distribution system that may be difficult or impossible to change in a short period of time. It would be desirable, therefore, to have a flexible, easily storable, and easily erectable system for business recovery.

SUMMARY OF THE INVENTION

There is, therefore, provided in a preferred embodiment of the present invention a business recovery installation and method for its erection that is easily erectable and storable, and that is flexible enough to allow for recovery of a wide variety of business operations. The method includes the steps of assembling an array of modular work stations in an enclosed area, e.g., a fixed, mobile, or fabric structure, and establishing a data link from each of the work stations to an on-site communications center. To establish the link, a modular overhead cable supporting structure, or trellis, is assembled and erected over the work stations. A modular network of horizontal wire-carrying conduits, or pods, is then installed under the trellis, each pod having a connector at one end and a plurality of preterminated outlets for establishing links between the pod and a group of respective work stations distributed along the pod. Cables are mounted on the trellis between the connector on the each pod and the communications center. To complete the data link, each work station is wired to a respective outlet of the pod.

BRIEF DESCRIPTION OF THE DRAWINGS

These and other features of the present invention will be better understood with reference to the following detailed description when considered in connection with the accompanying drawings wherein:

FIG. 6a is a close-up view of a typical set of modular jacks and plugs used in the conduit of FIG. 6; and FIG. 6b is a cutaway top plan view of the interior housing of the conduit of FIG. 6.

DETAILED DESCRIPTION

Figure 1:
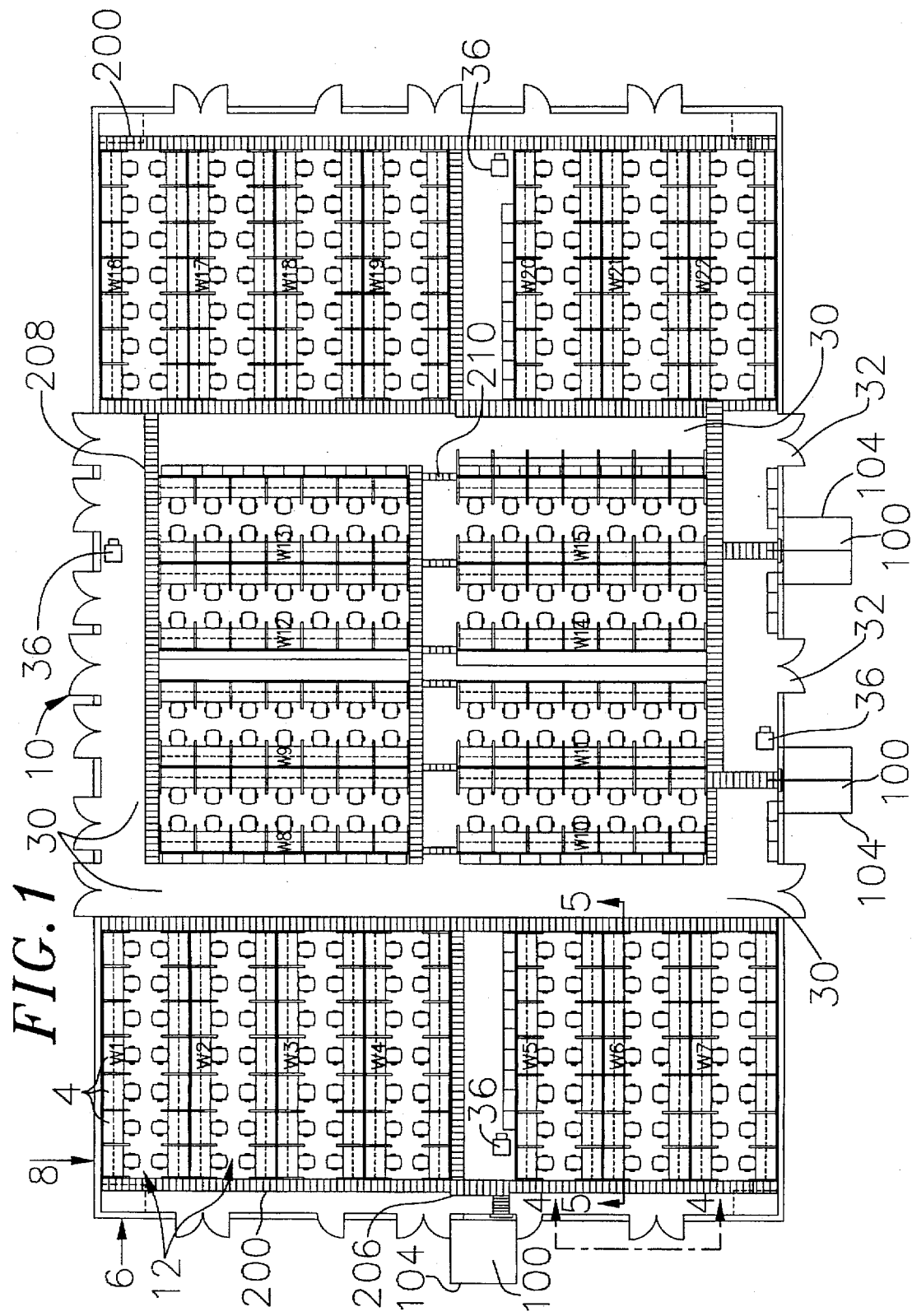
FIG. 1 is a top plan view of an exemplary array of work stations and overhead trellis structure located in an enclosed area.

Referring to FIG. 1, an exemplary business recovery system according to the present invention includes an array 2 of work stations 4 arranged in rows 6 and columns 8 in an enclosed area 10. The enclosed area may be any relatively large, covered and open space, for example, a hotel ballroom, a basement, or a tent. The array is subdivided into groups 12, each group containing several work stations. The layout of the array, including the number of groups and work stations, is chosen based on the particular needs of the business being recovered and can easily be altered.

Figure 5:
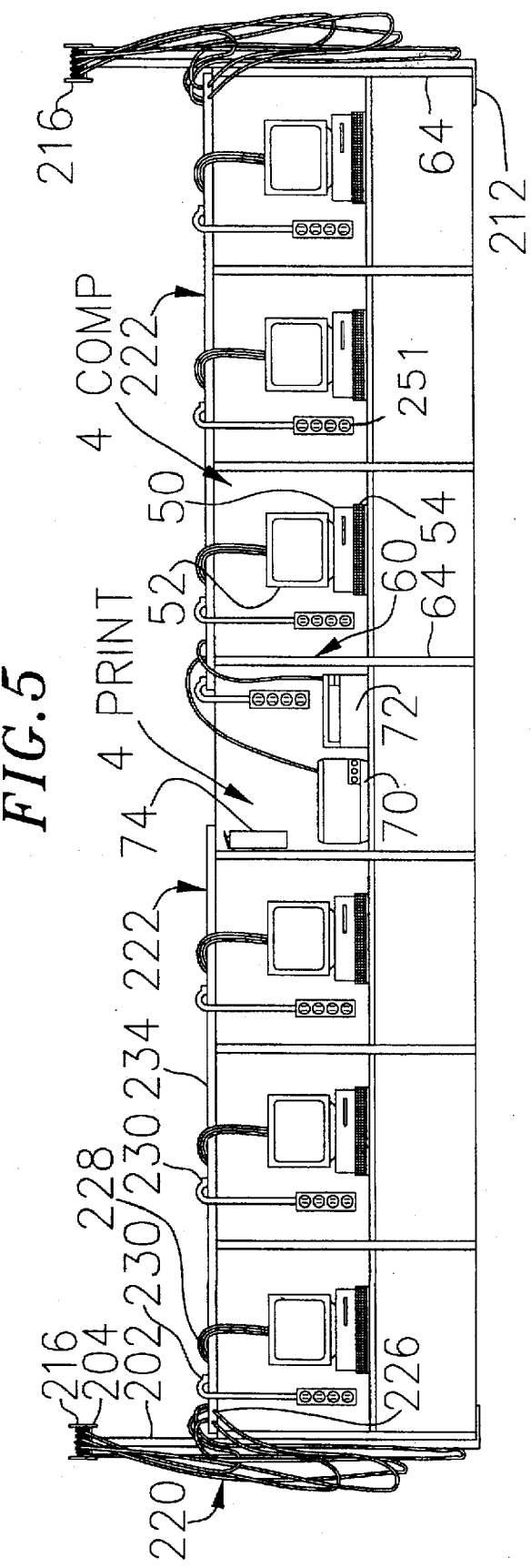
FIG. 5 is an end view of the array of work stations taken along line 5—5 of FIG. 4, also showing the adjacent conduits and trellis structure.

In the exemplary embodiment, the array is laid out for maximum utilization of employee resources in the available space. The total number of rows and columns is chosen to take into account space, volume, and safety considerations. For example, the groups are spread apart to allow for walkway space 30 and easy access to entrances and exits 32. The number of work stations in each group is chosen to take into account the type of equipment required on each work station and the amount of space needed in and around each station. The types of work stations in each group include computer work stations 4(comp) (FIG. 5) and shared printer/ facsimile stations 4(print) (FIG. 5). Four high-speed copiers 36 are placed outside of the groups along the outer periphery of the array.

Figure 2:
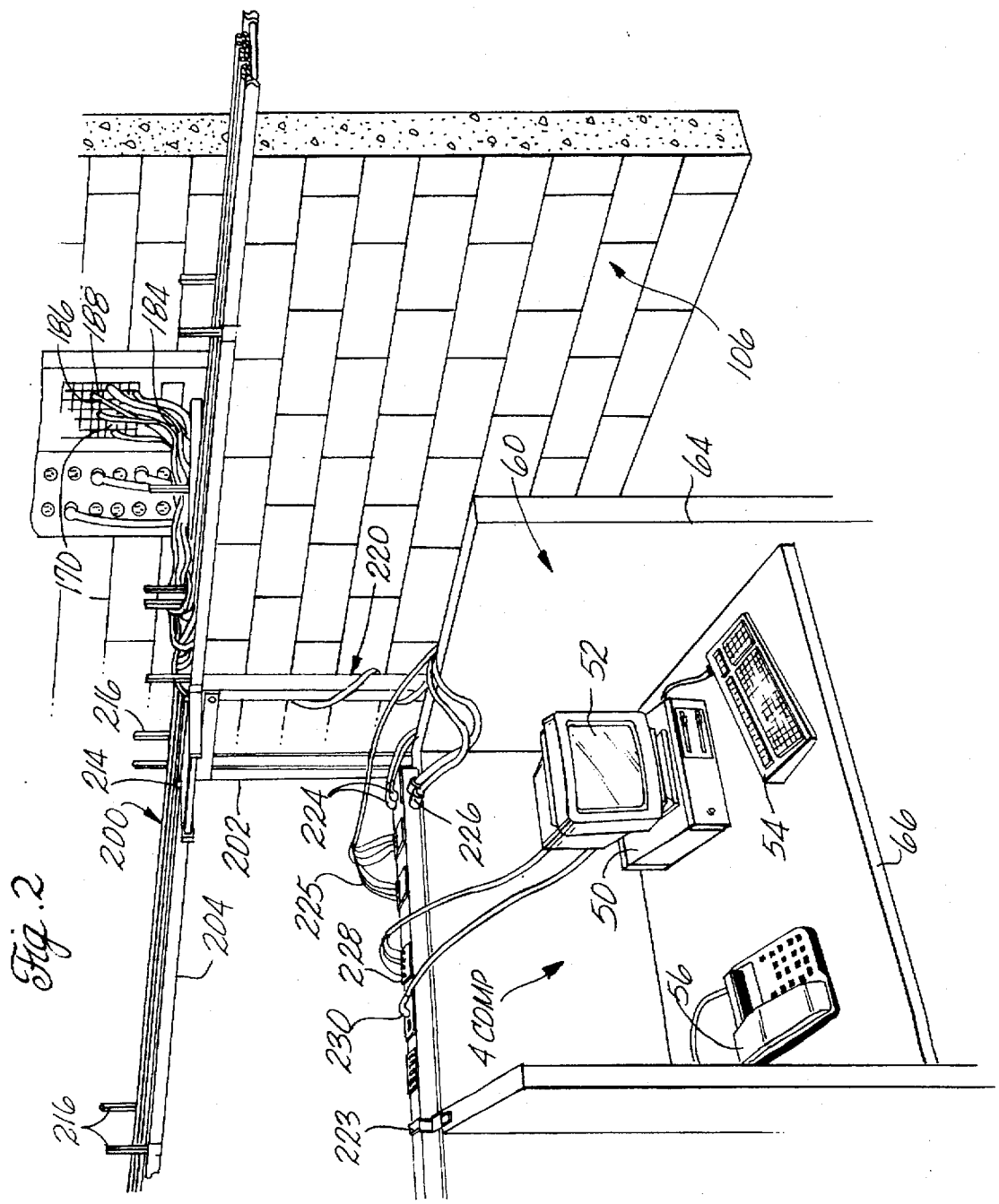
FIG. 2 is a perspective view of a typical work station and communications interface, trellis structure, and conduit for establishing data, voice and power links between the work stations and a communications center.

Referring to FIG. 2, the equipment in each computer work station is chosen to provide the same access to power, voice, and data as the employee would have at his or her own desk at the actual business facility. A typical computer work station includes a computer 50, a monitor 52, a keyboard 54, and a telephone 56 enclosed in a cubicle 60. The cubicle includes walls 64 made of sound absorbent material to reduce noise, and an optional extendible desk (not shown). Each computer preferably contains a built-in facsimile card (not shown) for transmitting and receiving facsimile messages directly from each work station, a modem (not shown) for data communication, and circuitry (not shown) for accessing the shared printer station. A typical printer station 4(print) (FIG. 5) includes a shared printer 70, a facsimile 72, and fire extinguisher 74. In either type of station, equipment may be added or removed to mirror the actual business facility or improve working conditions. For example, auxiliary lighting (not shown) may be added to either type of station.

In the exemplary embodiment, each cubicle is 5 feet tall, 5 feet wide, and 4 feet deep. The desks are 3 feet deep from the back of the cubicle. This allows for walkway space between work stations, even when a work station user is reclined in a chair. For easy storage and installation, the work station cubicles are preferably of rollaway, fold-out design and are modular for easy connection to adjacent cubicles. Because of these features and the relatively simple layout of the array, it has been found that a team of twenty unskilled laborers, such as hotel busboys, can usually erect 21 such work stations per hour working at a brisk pace.

Figure 3:
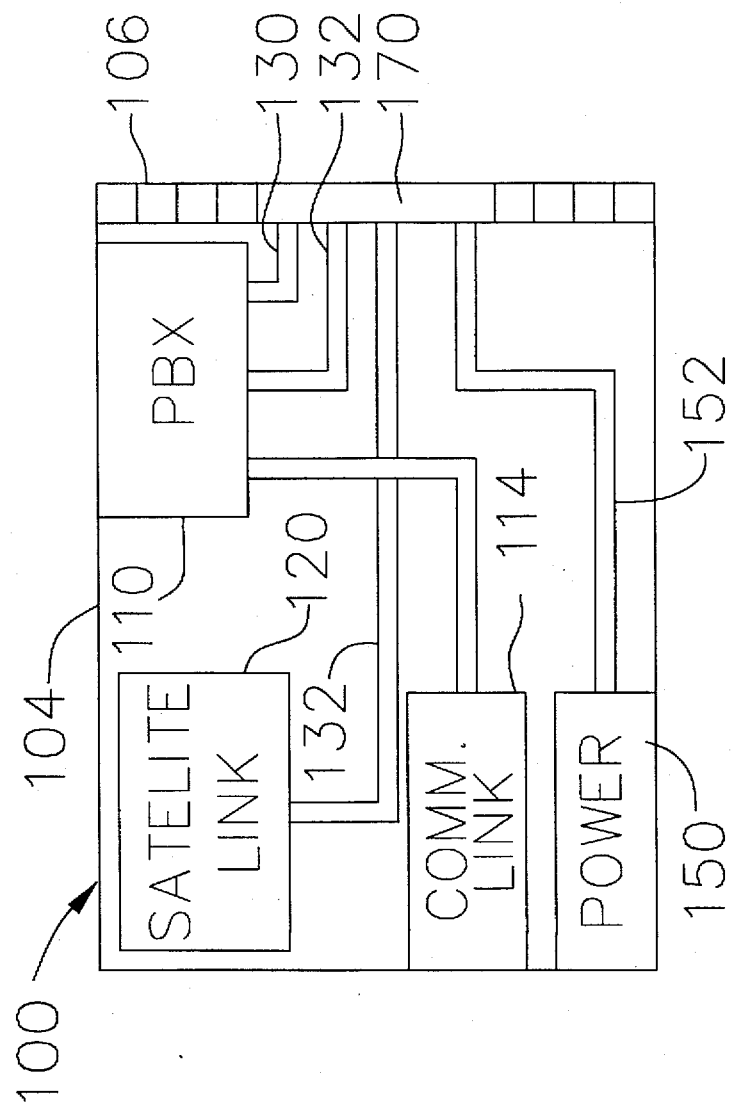
FIG. 3 is a block representation of the communications center for distributing power and providing a remote data an voice link between the work stations and other facilities.

Referring to FIG. 3, the central communications center 100, also called a primary distribution center or closet, is installed in a separate enclosed area 104 adjacent the array of work stations. The communications center is preferably separated from the enclosed area housing the work stations by a concrete wall 106 to prevent interference with the work stations. The wall may also be formed of plaster board or fabric, for example. The purpose of the communications center is to provide data, voice, and power links to the individual work stations, and satellite links to other facilities. The communications center can employ any communications technology to establish a wide-area network link such as, for example, a pbx server 110, a multichannel communications link 114 for voice and data communications to and from the facility, and a satellite link 120 for communication with a mainframe computer at a remote location. The server and communications link include closet-side data cables 130 and voice cables 132. A power distributor 150 provides power to each of the work stations through closet-side power cables 152. The communications center may also include a multiplexer (not shown) for transmitting a plurality of data and voice signals. An amplifier, or concentrator, may be located inside or outside of the communications center for boosting signals transmitted between the communications center and work stations.

Referring also to FIG. 2, once the communications center is installed, a communications interface 170 is set up to couple the closet-side main power cables, data cables, and voice cables from the communications center into the enclosed area housing the work stations. The communications panel is 4 feet by 4 feet in the exemplary embodiment. The interface allows for coupling of cables through a wall while maintaining full electrical and noise shielding between the communications center and the enclosed area. Once connections are made on the closet side of the communications interface, the interface is ready for connection to the power cables 184, data cables 186, and voice cables 188 (FIG. 2) on the work station side of the system.

The enclosed area for the communications center and the opening in the concrete wall for the interface are typically the only spaces that must be reserved or built in advance for the recovery system to be installed in a relatively short period of time. The enclosed area for the communications center, however, need only be a supply room or adjacent open covered space large enough to house the communications equipment. In some cases, the interface can be pre-installed and hidden behind wall panels or curtains. Also, redundant closets may be set up, depending on the size of the work area. In an alternate embodiment, the closet may be rack mounted on rollers and/or in a cabinet, thereby eliminating the need for a separate enclosed area and an opening in the wall for a communications interface. Because of its technical complexity, however, installation of the equipment within the closet or closets, and routing of wires from the closet to the interface usually requires skilled technicians.

Referring now to FIGS. 1, 2, 4, and 5, a modular cable supporting structure 200, also called a trellis or raceway, assembled over the work stations, spans the length of the room and branches outwardly adjacent the groups of work stations. The trellis is a simple modular lattice of lightweight metal, for example, aluminum supports, including legs 202 and horizontal supports 204. The purpose of the trellis structure is to carry the power, data, and voice cables above the floor level to prevent obstruction of walkways. The width of the horizontal supports is chosen to provide ample room for laying cables over the support. The horizontal supports vary in size according to the amount of cable the particular support must carry. For example, as shown in FIG. 1, relatively wide horizontal supports 206 having a width of 16 inches are used to carry the numerous cables emanating from the interface. Mid-size supports 208 having a diameter of 12 inches and thin supports 210 having a diameter of 6 inches are also used for local cable distribution.

As shown in FIG. 5, the base 212 of the legs fit under the cubicle wall 64 to add stability to the trellis. If necessary, one or more bases may be screwed into the ground for additional support. As shown in FIG. 2, the horizontal supports are fastened to the legs through J-screws 214. Vertical risers 216 are distributed along the horizontal supports to house the cables. The number of legs and the location of the legs are chosen to provide structural soundness and adequate support. The legs are preferably at least eight feet tall to provide ample headroom for people to pass under the horizontal supports.

The trellis is designed according to the array to provide cable access to each group of work stations. For ease of assembly, the legs are preferably premarked with group numbers and location numbers for positioning the legs in the proper location and connecting the legs to the proper horizontal supports. Using this installation scheme, it has been found that a team of twenty unskilled laborers can typically erect the entire trellis structure in less than eight hours.

The cable supporting structure, or supporting means, is not limited to a trellis. The supporting means may also encompass any other cable supporting structure such as a pseudofloor for channeling cables beneath a walking surface, or ceiling extensions for hanging the cables from the ceiling of the enclosed area.

In the case of a trellis, once the trellis structure or free-standing portions of the trellis structure are erected, the work-station side power cables 104, data cables 186, and voice cables 188 can be laid out from the communications interface 170 (FIG. 2) over the trellis. The cables are channeled along the trellis according to designated cable sets 220, each cable set including the power, data, and voice cables necessary to support one group of work stations. In each cable set, the power, data, and voice lines are preferably of modular design and tagged with alphanumeric characters corresponding to the appropriate interface connection on the communications interface. Also, the numbered cables are preferably of preset length to reach a location adjacent the group of work stations to which the particular corresponds. The power cables are preferably shielded to prevent interference between the adjacent power and data cables. The data and telephone links may be of copper, fiber, or wireless design.

Figure 6:
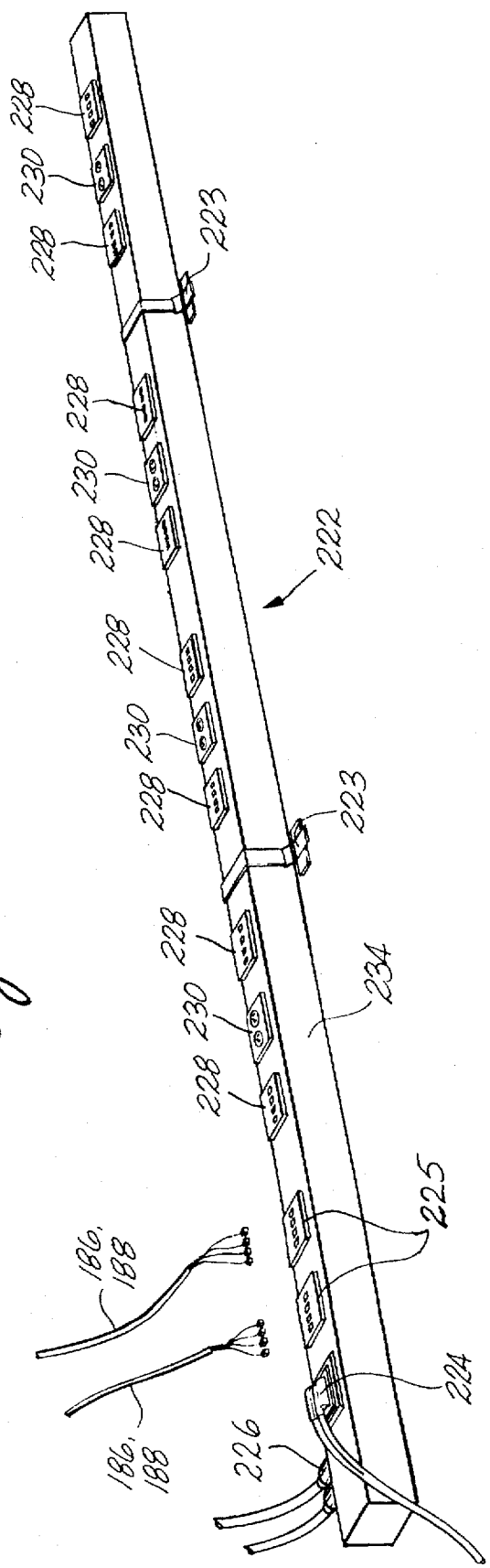
FIG. 6 is a perspective view of the conduits of FIGS. 2, and 5.

Referring to FIGS. 2 and 6, once the appropriate cable sets are laid out along the trellis, a modular network of horizontal wire-carrying conduits 222, such as pods, is assembled and fastened using fasteners 223 along the work station cubicles under the trellis. The pods allow for integrated (co-existing) distribution of power, data, and voice, important for flexibility in a business recovery system. More particularly, the pods are used to link the power, data, and voice cable sets from the trellis structure to the individual work stations. The pods also provide connections 224 for operation of various print share devices in each group. Each pod has a data/voice connector 225 and power connector 226 at one end for receiving cables from the trellis. Each pod also has a plurality of data/voice outlets 228 and power outlets 230 along its length adjacent to the respective work stations to complete data, telephone, and power links between the work stations and the communications center. The pods are designed to allow back-up connectivity. Two pods are used per 14 work station groups to allow full connection to each of the work stations. The pair of pods is capable of serving 16 work stations. In the exemplary embodiment, therefore, if one set of outlets and jacks becomes defective, another can be used. Also, because the pods are identical to one another, if more than one outlet of the pod is defective, the entire pod can readily be replaced with another pod.

Referring to FIGS. 6 and 6a, the free-standing pod has a rectangular outer casing 234 formed of lightweight insulating material such as extruded plastic for easy handling and shielding. Each power outlet 230 on the pod comprises a pair of 220 volt standard electrical plug connectors 240. Each voice/data outlet includes analog teledevice jacks 242, digital telephone jacks 246, two-way data jacks 248, and print share jacks 250 for complete junction of power, data, and telephone cabling. All the jacks used in the pod are identical to those used in conventional business facilities. Therefore, equipment used in the actual business facility may be transferred to the temporary facility and readily integrated into the system. Surge protection circuitry 251 (FIG. 5) may be incorporated into the system for preventing power surges from damaging the work stations.

Referring to FIG. 6b, within the housing of the pod, an interior shield 252 transects the length of the pod interior to prevent the power cables from interfering with the voice and data cables.

The conduit means is not limited to a pod itself, but also includes any other type of conduit for channeling cables. Such conduits may include a conventional rain gutter or other suitable structure for distributing the cables from the supporting means to the work stations.

Referring again to FIGS. 4 and 5, once the cable sets from the communications center are mounted on the trellis structure, each cable set is dropped off of the trellis structure adjacent the designated pods for a particular group. The pair of pods for a group are fed from each end. End mounting allows for ease of connectivity from each end of a group of work stations. Also, because of end mounting, wire slack hangs over the ends of groups, allowing for work space unobstructed by cables. Ample wiring is available for use with different furniture requiring longer cables. Modular connectors and electrical plugs on the cables are then attached to the main modular connectors on each pod. The local cable sets 220 are then connected between the pod outlets and the work stations to complete the power, data, and telephone links. In practice, the thumb fasteners 223 (FIGS. 1, 6) are locked after connecting the local cable sets so that the pods can be tilted toward the particular work station being wired. Suitable fasteners are commercially available from Fastening Solutions, Inc. of Van Nuys, Calif., for example.

Figure 4:
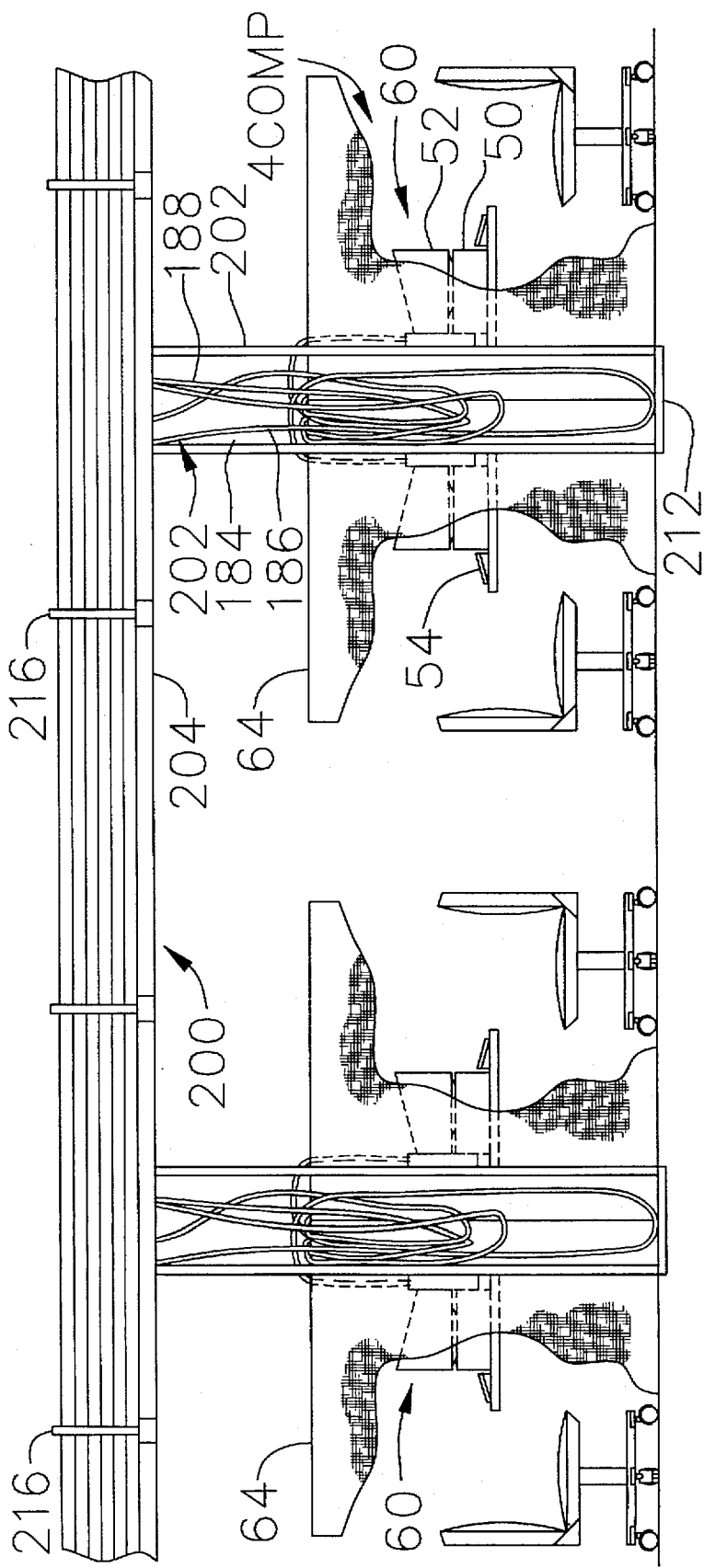
FIG. 4 is a cutaway side view of an exemplary group of work stations taken along line 4—4 of FIG. 1, showing the adjacent conduits and trellis structure.

Referring to FIGS. 1, 4, and 5, one skilled in the art can see that the arrangement whereby the work stations are arranged in parallel adjacent rows, the work station of one row facing toward one adjacent row and away from another adjacent row, such that an aisle is formed between the rows that face away from each other, is beneficial in that it allows the cables from neighboring work stations to easily be combined on the trellises. Furthermore, each work station has a three sided rectangular cubicle and an access arranged so one side of the cubicle has a common wall with the adjacent row facing toward the work station and an access opening into an aisle. Each cubicle has a second side having a common wall with a neighboring work station in the same row, and a third side having a common wall with a different neighboring work station in the same row. The work stations are arranged in columns perpendicular to the rows, and the trellises are arranged perpendicular to the rows along the ends of the rows to carry the cables to the work stations, horizontally above the level of the work stations. The pods are arranged between the rows of work stations facing each other, and the cables extend vertically downward from the trellises to the pods at the ends of the rows. The pods are mounted on the top of the common walls between adjacent rows. Each pod includes data/voice and power connectors. As seen in FIG. 1, the work stations may be arranged into first and second arrays such that the rows of the first array are perpendicular to the columns of the second array. The trellises are arranged such that the first trellis is arranged perpendicular to the rows of the first array along the ends of the rows of the first array and a second trellis is arranged perpendicular to the rows of the second array along the ends of the rows of the second array, wherein the first and second trellises join together perpendicularly to carry the cables to the work stations.

In summary, the system according to the present invention is designed for rapid installation. Many installation steps can be conducted in parallel to reduce the total installation time. For example, because the trellis is independent of the furniture, both can be installed simultaneously. Then, when free-standing portions of the trellis are set up, cables and pods can be distributed simultaneously along with set up of equipment within the work stations. The communications set up can also be achieved independently of all of the above.

The completed system provides business recovery by providing fully operational computer and telephone facilities linked by satellite and/or conventional means to remote facilities. The system is flexible and easily erectable in a relatively short period of time. As described, 120 work stations per day can typically be erected by a team of workers and technicians. Also, because the bulk of the system comprises premarked, modular connections of cabling and support structure, unskilled labor can perform a substantial amount of the total setup.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of the invention. For example, the number of groups or work stations in a group could easily be altered to provide an array suitable for any given enclosed area. The shape of the modular trellis structure could be altered to fit into such a structure. The conduits can then be arranged accordingly to establish a local data and power link to each of the work stations. Also, the communications center may be housed on a mobile roller for easy movement and set up.

What is claimed is:

1. A method for erecting a temporary business facility comprising the steps of:
   assembling an array of modular work stations in an enclosed area;
   assembling a modular cable supporting structure over the work stations;
   installing a modular network of horizontal wire-carrying conduits along the work stations under the support structure, each conduit having a connector at one end and a plurality of outlets along its length adjacent to the respective work stations;
   mounting cables on the support structure, each cable having connectors at its ends;
   joining the connector at one end of each cable to the connector of one of the conduits;
   joining the connector at the other end of each cable to a communications center; and
   connecting a computer at each work station to one of the outlets along the length of the adjacent conduit to establish a data link to the communications center.

2. The method of claim 1 wherein the step of assembling the array of work stations comprises dividing the array into a plurality of groups, each group including a plurality of work stations.

3. The method of claim 1 wherein the step of assembling the modular cable supporting structure comprises connecting a plurality of legs and horizontal supports according to designated codes assigned to each of the legs and supports.

4. The method of claim 1 wherein the step of installing a modular network of horizontal wire-carrying conduits comprises fastening the conduits to cubicles housing individual work stations.

5. The method of claim 1 further comprising the step of designating the cables according to groups of work stations to which the cables will be connected before mounting the cables on the support structure.

6. The method of claim 1 further comprising a step of connecting a telephone at each work station to another one of the outlets along the length of the adjacent conduit to establish a telephone link to the communications center.

7. A temporary business facility comprising:
   a communications center;
   a plurality of work stations located in an enclosed area;
   a trellis assembled over the plurality of work stations for supporting cables from the communications center;
   a plurality of wire-carrying conduits adjacent the work stations for coupling the cables from the communications center to the work stations, thereby establishing a data link between the work stations and the communications center.

8. The temporary business facility of claim 7 wherein the communications center comprises wide-area network connection.

9. The temporary business facility of claim 7 wherein the enclosed area comprises a fabric structure.

10. The temporary business facility of claim 7 wherein the trellis comprises a plurality of legs and horizontal supports designated with codes for facilitating assembly of the trellis.

11. The temporary business facility of claim 7 further comprising an interface panel between the communications center and trellis for channeling the cables and maintaining shielding between the work stations and communications center.

12. The temporary business facility of claim 7 wherein each wire-carrying conduit comprises a main inlet for receiving cables from the trellis and a plurality of outlets for connecting wires between the conduit and the work stations.

13. The temporary business facility of claim 7 wherein the plurality of work stations are arranged in an array comprised of a plurality of groups.

14. The temporary business facility of claim 13 wherein each group comprises at least one group work station and one printer shared by the group work stations.

15. The temporary business facility of claim 7 wherein the communications center is housed on a mobile cart.

16. The temporary business facility of claim 7 wherein each work station comprises a computer, telephone, and monitor.

17. The temporary business facility of claim 7 wherein the trellis is separate from the plurality of work stations.

18. The temporary business facility of claim 7 wherein the cables supported by the trellis are exposed.

19. A temporary business facility comprising:
   a communications center for establishing a link with a remote location;
   a plurality of work stations for providing user interfaces, the work stations being arranged in parallel adjacent rows having a wall extending between the work stations, the work stations of one row facing toward one adjacent row and away from another adjacent row, such that an aisle is formed between the rows that face away from each other;
   a plurality of cables emanating from the communications center;
   supporting means for supporting the cables from the communications center to the plurality of work stations; and
   a plurality of conduits supported along the wall between the work stations adapted to link the cables to the work stations, each of the conduits having means at one end for removably securing the cables supported by the supporting means, and a plurality of outlet means comprising electrical outlets and communication jacks along its length.

20. The temporary business facility of claim 19 wherein the work station comprises a computer.

21. The temporary business facility of claim 19 wherein the work station comprises a printer work station shared by a plurality of users.

22. The temporary business facility of claim 19 wherein the supporting means comprises a trellis structure for supporting the cables overhead.

23. The temporary business facility of claim 19 wherein the cables comprise voice, data, and power cables.

24. The temporary business facility of claim 19 wherein the supporting means is separate from the plurality of work stations.

25. The temporary business facility of claim 19, in which each work station has a three sided rectangular cubicle and an access arranged so one side of the cubicle has a common wall with the adjacent row facing toward the work station and an access opening into an aisle.

26. The temporary business facility of claim 19 wherein the conduit comprises modular communication jacks for voice and data transmission.

27. The temporary business facility of claim 19 wherein the work stations are arranged in parallel adjacent rows having a common wall extending between the work stations.

28. The temporary business facility of claim 19 wherein the conduits have modular connections at one end for removably securing the cables from the support means, and a plurality of modular communication jacks along its length.

29. A method for rapidly erecting a temporary business facility comprising the steps of:

assembling an array of modular work stations in an enclosed area, the work stations being arranged in parallel adjacent rows having a wall extending between the work stations;

assembling a modular cable supporting structure separate from the work stations;

installing a modular network of wire-carrying conduits supported along the wall between the work stations, each conduit having a connector at one end for removably securing cables and a plurality of outlets along its length;

mounting cables on the support structure, each cable having a connector at its end;

joining the connector at one end of each cable to the connector of the conduit;

joining the connector at the other end of each cable to a communications center; and connecting a computer at each work station to one of the outlets along the length of the adjacent conduit to establish a data link to the communications center.

* * * * *